US012124390B2

(12) United States Patent
Maung et al.

(10) Patent No.: US 12,124,390 B2
(45) Date of Patent: Oct. 22, 2024

(54) PARTIAL BIT FILTER FOR USB INTERFACE

(71) Applicant: TEXAS INSTRUMENTS INCORPORATED, Dallas, TX (US)

(72) Inventors: Win N. Maung, Plano, TX (US); Suzanne M. Vining, Plano, TX (US); Julie Nirchi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 130 days.

(21) Appl. No.: 17/680,697

(22) Filed: Feb. 25, 2022

(65) Prior Publication Data

US 2023/0111357 A1   Apr. 13, 2023

Related U.S. Application Data

(60) Provisional application No. 63/254,646, filed on Oct. 12, 2021.

(51) Int. Cl.
*G06F 13/38*       (2006.01)
*G06F 13/42*       (2006.01)

(52) U.S. Cl.
CPC ........ *G06F 13/382* (2013.01); *G06F 13/4282* (2013.01); *G06F 2213/0042* (2013.01)

(58) Field of Classification Search
CPC ................ H03K 5/1252; H03K 19/017545
See application file for complete search history.

(56) References Cited

U.S. PATENT DOCUMENTS

| 11,228,314 | B1 * | 1/2022 | Delshadpour .. H03K 19/017545 |
| 11,368,145 | B1 * | 6/2022 | Liu ....................... H03K 5/2472 |
| 2007/0238429 | A1 * | 10/2007 | Song ..................... H03G 3/341 |
| | | | 455/222 |
| 2008/0165902 | A1 * | 7/2008 | Moriwaki ........... H04L 25/0272 |
| | | | 375/340 |
| 2013/0251016 | A1 * | 9/2013 | Yap ....................... G06F 1/3253 |
| | | | 375/224 |
| 2016/0187392 | A1 * | 6/2016 | Kumar ................... G01R 19/04 |
| | | | 324/76.12 |
| 2016/0205643 | A1 * | 7/2016 | Ko ....................... H04B 7/15507 |
| | | | 370/315 |
| 2020/0073839 | A1 | 3/2020 | Maung et al. |

\* cited by examiner

*Primary Examiner* — Getente A Yimer
(74) *Attorney, Agent, or Firm* — John R. Pessetto; Frank D. Cimino (57) ABSTRACT

Data communication devices, e.g., eUSB2 repeaters, include a partial bit filter to filter out a partial bit so it is not transmitted. The partial bit filter includes state-detection-and-hold circuitry having first and second differential signal inputs, a first output and a second output; logic circuitry having a first input coupled to the first output of the state-detection-and hold circuitry, and a second input coupled to the second output of the state-detection-and hold circuitry; and filter circuitry coupled to the logic circuitry and having a control output. The filter circuitry may be implemented as a latch or a network of flip flops. The output control signal of the partial bit filter may be applied to a transmitter in an eUSB2 repeater or to a pass-gate at the output of the transmitter.

19 Claims, 8 Drawing Sheets

PARTIAL BIT FILTER FOR USB INTERFACE

CROSS-REFERENCE TO RELATED APPLICATION

This application claims priority under 35 U.S.C. § 119 on U.S. provisional application No. 63/254,646, entitled "Partial Bit Filter for eUSB2 to USB 2.0 Repeater High-Speed Start of Packet Without Using PLL or CDR," filed Oct. 12, 2021, the entire content of which is incorporated by reference herein in its entirety.

FIELD OF DISCLOSURE

This disclosure relates generally to Universal Serial Bus (USB) interfaces, e.g., USB repeaters and re-drivers, and more specifically to USB interfaces with partial bit filter functionality, and methods of operating such interfaces.

BACKGROUND

The embedded USB2 (eUSB2) specification is a supplement to the Universal Serial Bus (USB) 2.0 specification (each of which is hereby incorporated by reference in its entirety) that enables integration with advanced system-on-chip (SoC) process nodes by enabling USB 2.0 interfaces to operate at I/O voltages of 1 V or 1.2 V, instead of 3.3 V. Thus, eUSB2 enables more power-efficient SoCs, which in turn, enables continued scaling of process nodes while increasing performance in electronic devices, e.g., smartphones, tablets and notebooks.

eUSB2 can support onboard inter-device connectivity through direct connection between two eUSB2 configured elements, as well as through a repeater, which is used to transition the difference in voltage between that used in advanced SoCs (1 V or 1.2 V) and that used in legacy applications (3.3 V). An eUSB2 repeater is a half-duplex bidirectional interconnect that operates as a bridge or non-linear re-driver to perform level shifting to enable a legacy USB device to communicate with an eUSB2 device, and vice versa. A USB re-driver may be used to extend link distances and boost signal quality on a USB bus.

An eUSB2 repeater, as per the specification, is implemented without a clock data recovery (CDR) circuit, a phase-locked loop (PLL), or a first-in-first-out (FIFO) component. Without such functionality, an eUSB2 repeater cannot buffer and resynchronize start of packet (SOP) synchronization bits to send via the output stage transmitter of the eUSB2 repeater, which may lead to SOP bits being truncated. Even though the eUSB2 specification allows for truncation of synchronization (sync) bits, including partial sync bit truncation, many existing USB devices do not handle the partial bit correctly and as a result miss a whole packet.

An eUSB2 repeater has a squelch detector, which outputs an un-squelch signal that is used by repeater logic in the eUSB2 repeater to ensure that noise, which may have been amplified over multiple gain stages, is not transmitted at the output. However, there is a delay in transmitting the un-squelch signal, which is caused in part by the threshold valid signal requirement. That is, the squelch detector does not output an un-squelch signal until a high enough signal is detected to distinguish valid incoming data from noise. The partial bit issue arises as a result of this delay, which could cause the transmitter of the eUSB2 repeater to be enabled in the middle of a bit, causing a partial bit at the output.

While legacy USB 2.0 hubs may use a PLL to re-clock the output states of SOP bits without transmitting a partial bit, the addition of the PLL increases power consumption, size and cost.

Thus, there is a need for a USB interface, e.g., an eUSB2 repeater and/or a re-driver, that has the capability to filter out a partial bit without the need for a component such as a CDR or PLL.

SUMMARY

In an example, a partial bit filter, which may be part of a USB communication system, comprises state-detection-and-hold circuitry having a first differential signal input, a second differential signal input, a first output and a second output; logic circuitry having a first input coupled to the first output of the state-detection-and hold-circuitry, and a second input coupled to the second output of the state-detection-and-hold circuitry; and filter circuitry coupled to the logic circuitry, the filter circuitry having a control output. The filter circuitry is configured to filter a partial bit.

In an example, a data communication device, e.g., an eUSB2 repeater, comprises a receiver having first and second data inputs and first and second data outputs; a loss of signal detector coupled to the receiver, the loss of signal detector having first and second inputs and an output; a squelch detector having first and second inputs coupled to the first and second data inputs of the receiver, the squelch detector further having an output; and a partial bit filter having a first differential signal input, a second differential signal input, one or more inputs coupled to at least one of the output of the squelch detector and the output of the loss of signal detector, a reset signal input, and control output. In an example, partial bit filter may have a squelch signal input coupled to the output of the squelch detector and a loss of signal input coupled to the output of the loss of signal detector.

In an example, a method of operating a data communication device comprises: detecting a first state in a data synchronization sequence of a data signal, the first state transitioning in a first direction; outputting a first state detection signal at a first output level in response to detecting the first state; detecting a second state in the data synchronization sequence of the data signal, the second state transitioning in a second direction that is different than the first direction; maintaining the first state detection signal at the first output level for a set time in response to detecting the second state; outputting a second state detection signal at the first output level in response to detecting the first state; and outputting a control signal, by a partial bit filter of the data communication device, based on the first and second state detection signals.

These and other features will be better understood from the following detailed description with reference to the accompanying drawings.

BRIEF DESCRIPTION OF THE DRAWINGS

Features of the disclosure may be understood from the following figures taken in conjunction with the detailed description.

The same reference numbers and other reference designators are used in the drawings to designate the same or similar (structurally and/or functionally) features.

DETAILED DESCRIPTION

Specific examples are described below in detail with reference to the accompanying figures. These examples are not intended to be limiting. The objects depicted in the drawings are not necessarily drawn to scale.

In example arrangements, in a communication device, e.g., an eUSB2 repeater, the polarity (e.g., J or K state) of incoming sync bits of a data synchronization sequence of a data signal is determined using J and K state signal detectors. The output states of the detectors are held for a long enough time after the J or K state ends to ensure that when used as a clock pulse or latch enable, it meets the minimum width to avoid metastable state of the storage component, whether flip-flop or latch. Using fast combinatorial logic, an enable signal is output to a transmitter or pass-gate disposed at the output of the transmitter when the beginning or end of the first complete, not partial, bit of the data synchronization sequence (either J or K) is detected. By doing so, any partial bit is filtered out and not repeated.

Figure 1:
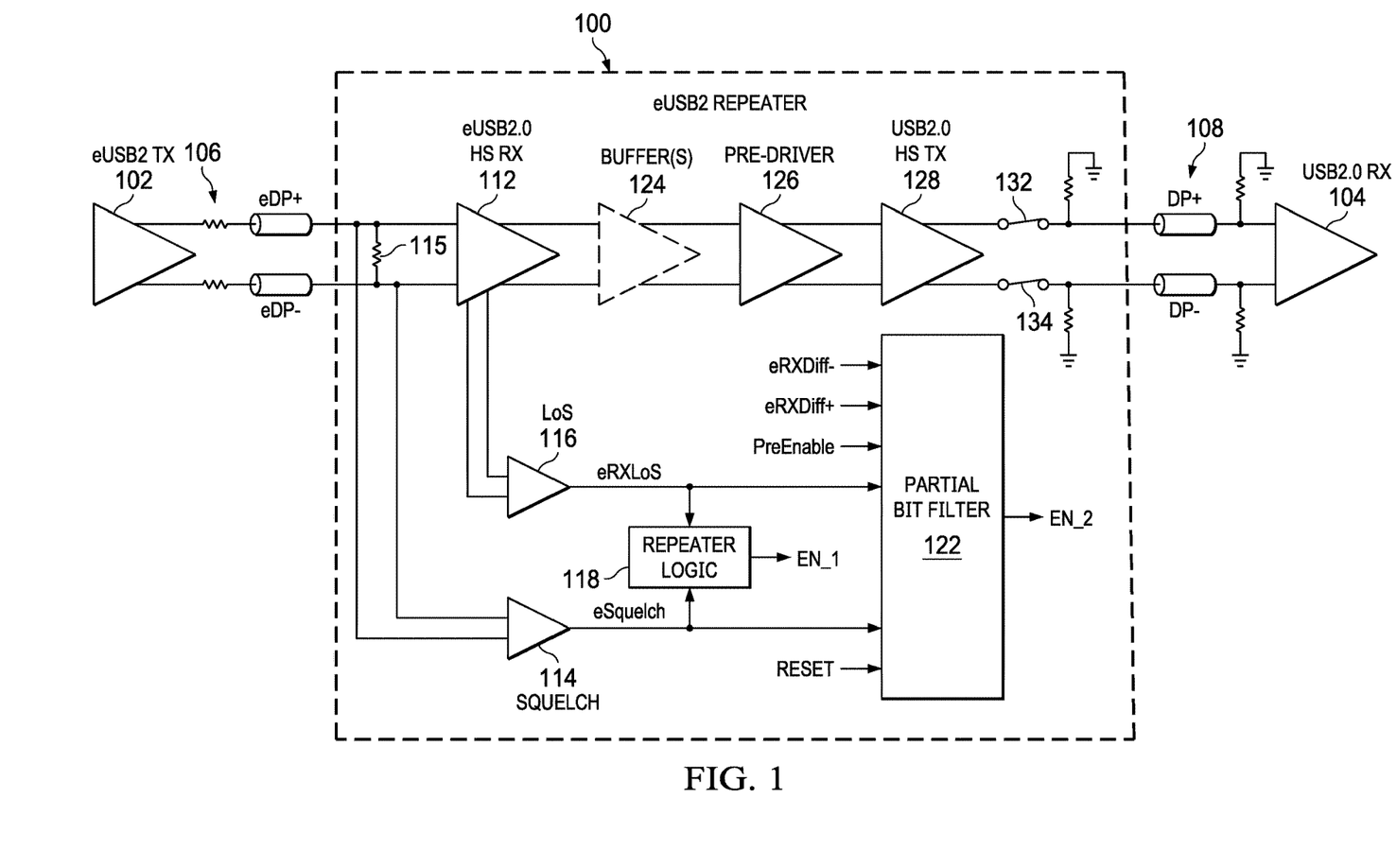
FIG. 1 is a diagram showing an example eUSB2 repeater including a partial bit filter in a data communication pipeline.

FIG. 1 is a diagram of an example eUSB2 repeater 100 that receives data from an external eUSB2 transmitter (TX) 102 and transmits data to an external USB 2.0 receiver (RX) 104. Example eUSB2 repeater 100 communicates with eUSB2 transmitter 102 via a pair of bidirectional digital transmission lines 106 carrying differential signals eDP+/eDP−, while eUSB repeater 100 communicates with USB 2.0 receiver 104 via a pair of bidirectional analog transmission lines 108, which carry differential signals eDP+/eDP−.

Example eUSB2 repeater 100 includes an eUSB2 high-speed receiver (HS RX) 112 having two inputs coupled to the differential signal transmission lines 106, respectively. As is known in the art, transmission lines 106 may include series resistance between eUSB2 transmitter 102 and eUSB2 high-speed receiver 112, as shown in FIG. 1.

A squelch detector 114 of eUSB2 repeater 100 has a first input coupled to the eDP+ transmission line upstream of a resistor 115 coupling transmission lines 106. A second input of squelch detector 114 is coupled to the eDP− transmission line downstream of resistor 115. Squelch detector 114 is configured to output a logic signal (eSquelch) at a first level (e.g., a logic low signal) when the differential between the eDP+ and eDP− signals is equal to or exceeds a squelch threshold and outputs that logic signal at a second level (e.g., a logic high signal) when that differential is less than the threshold, thus providing an indication as to whether differential data is being received.

Example eUSB2 repeater 100 also includes a loss-of-signal (LoS) detector 116, which receives input signals from eUSB2 high-speed receiver 112. LoS detector 116 detects whether the incoming signals on transmission lines 106 represent a valid signal, as opposed to noise or other disturbances. LoS detector 116 outputs a logic signal (eRX-LoS) at a first level (e.g., a logic low signal) in response to detecting a valid signal and outputs that logic signal at a second level (e.g., a logic high signal) when a valid signal is not detected.

The outputs of squelch detector 114 and LoS detector 116 (eSquelch and eRXLoS, respectively) are input to repeater logic 118 of eUSB2 repeater 100. Based on these signals, repeater logic 118 outputs an enable signal (EN_1). Repeater logic 118 receives other inputs and performs other functions, as is known in the art. Such detail, which is not directly pertinent to the present disclosure, is omitted for the sake of clarity.

The outputs of squelch detector 114 and LoS detector 116 (eSquelch and eRXLoS, respectively) are also input to a partial bit filter 122 of eUSB2 repeater 100. Partial bit filter 122 also receives as inputs the following signals: eRX Diff−, eRXDiff+, pre-enable (PreEnable), and RESET. The pre-enable signal and corresponding input are primarily for power-saving. Based on these inputs, partial bit filter 122 outputs a control signal (EN_2), which in some examples may be used as an enable signal. Partial bit filter 122 is described in more detail below, as are specific uses of the signals (EN_1 and EN_2).

The differential signal chain of example eUSB2 repeater 100 may also include the following components: buffer(s) 124, as needed, a pre-driver 126 and a USB 2.0 high-speed transmitter (HS TX) 128, coupled as shown in FIG. 1. Each of the differential signal lines coupled to the output of USB 2.0 high-speed transmitter 128 may include a resistive shunt path within eUSB2 repeater 100, and a matching resistive shunt path may be coupled to each of transmission lines 108 external of eUSB2 repeater 100. In an example, each of the shunt paths may include a resistor of approximately 45Ω. In some examples, pass-gates or switches 132 and 134 are formed in the signal lines between USB 2.0 high-speed transmitter (or simply transmitter hereafter) 128 and the resistive shunt paths. In other examples, the signal lines are continuous between those points, in which case 132 and 134 simply represent continuous wire or trace.

Figure 2:
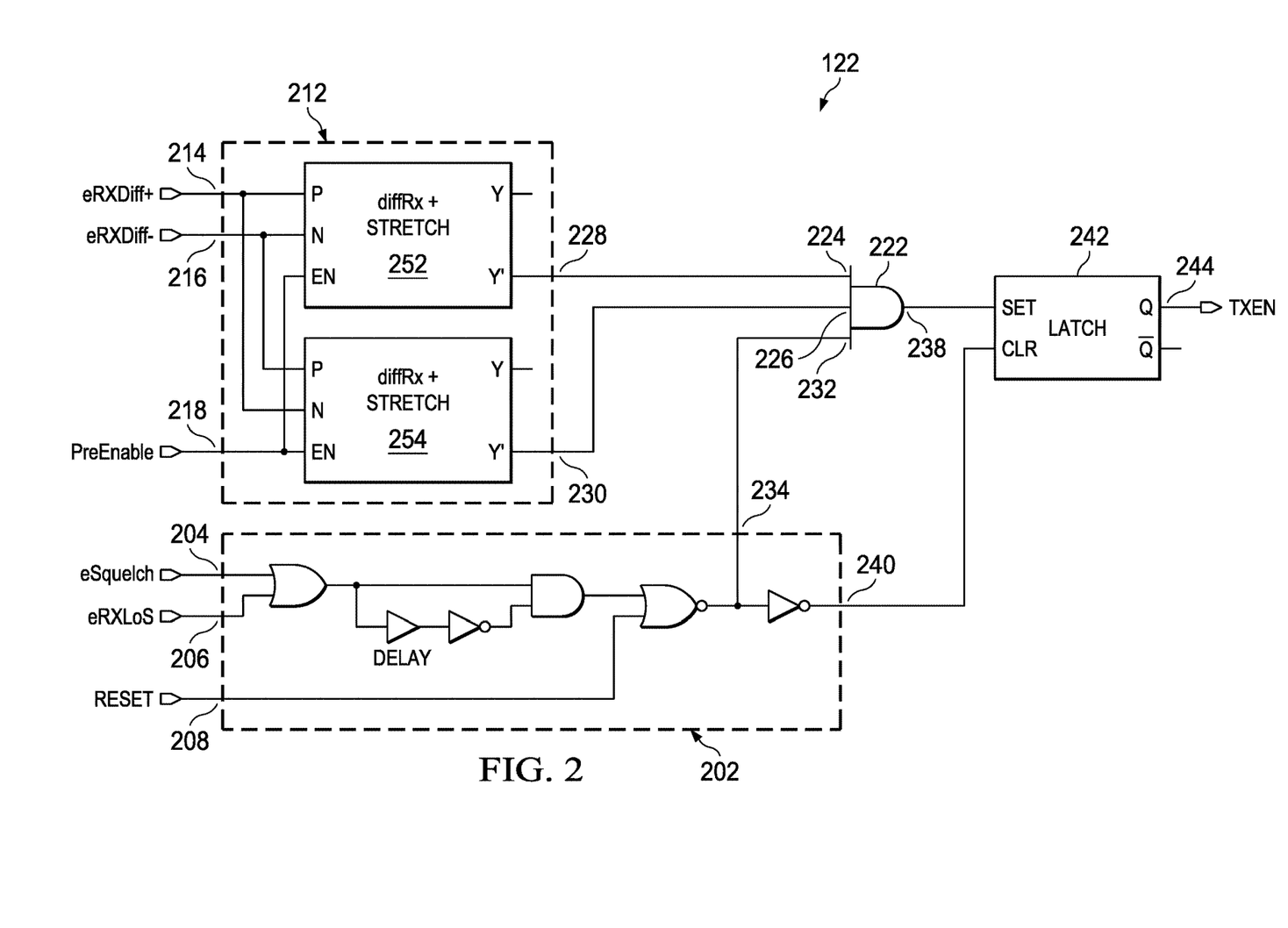
FIG. 2 is a diagram showing an example partial bit filter implemented in part as a latch.

FIG. 2 shows partial bit filter 122 implemented in part as a latch. In this example, partial bit filter 122 includes a transmit disable pulse generator 202 having a squelch signal input 204 to receive the output signal (eSquelch) of squelch detector 114, a loss of signal input 206 to receive the output signal (eRxLoS) of LoS detector 116, and a reset signal input 208 to receive the reset signal (RESET) to initialize the latch at power-up or reinitialize after power-up. Example partial bit filter 122 also includes state-detection-and-hold circuitry 212 having first and second differential signal inputs 214 and 216 to receive differential signals eRXDiff+ and eRXDiff−, respectively, and a pre-enable signal input 218 to receive the pre-enable signal (pre-Enable). Example partial bit filter 122 also includes logic circuitry having first and second inputs 224 and 226 coupled to first and second outputs 228 and 230 of state-detection-and hold circuitry 212, respectively, and a third input 232 coupled to an output 234 of transmit disable pulse generator 202. In an example, logic circuitry 222 may be a three input AND gate. In this example, transmit disable pulse generator 202 includes another output 240.

A latch 242 includes set (SET) and clear (CLR) inputs, which are coupled to an output 238 of logic circuitry 222 (e.g., AND gate) and to output 240, respectively. Alternatively, the clear input of latch 242 may be coupled to another source, e.g., output of squelch 114 and/or output of LoS 116, to receive an indication that there is no active signal, i.e., the bus is idle. Latch 242, which functions as filter circuitry, has an enable output 244 at which a transmitter enable signal (TXEN) is output. Transmitter enable signal (TXEN) corresponds to EN_2 of FIG. 1.

Transmit disable pulse generator 202, which receives the outputs of squelch detector 114 and LoS detector 116, acts as a check on the determinations made by those components. To that end, transmit disable pulse generator 202 includes logic to detect that the incoming differential signal is above a noise threshold and thus represents valid data. The signals eSquelch and eRXLoS are input to an OR gate, which output is coupled to an input of an AND gate and to the input of a delay buffer. The output of the delay buffer is coupled to the input of an inverter, the output of which is coupled to the other input of the AND gate. The output of the AND gate is coupled to an input of a NOR gate, which receives the reset signal (RESET) at its other input. The output of the NOR gate is output 234 of transmit disable pulse generator 202. In an example, transmit disable pulse generator 202 outputs a logic high signal (i.e., a "1") pulse at output 234 when end of valid data is detected. Transmit disable pulse generator 202 also includes an inverter, the input of which is coupled to the output of the NOR gate. The output of the inverter is output 240.

Figure 4A:
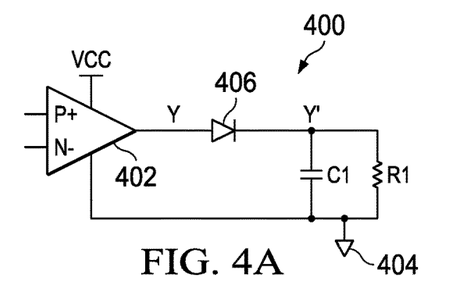
FIGS. 4A and 4B are diagrams showing examples of state-detection-and-hold circuits, either or both of which may be embodied in an example partial bit filter.
Figure 4B:
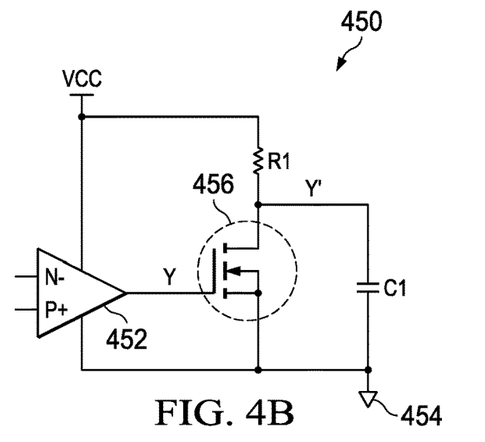

State-detection-and-hold circuitry 212 may include two state-detection-and-hold circuits 252 and 254, each of which has a positive (P) input terminal, a negative (N) input terminal, and an enable (EN) input terminal. The eRXDiff+ signal is input to the positive terminal of circuit 252 and to the negative terminal of circuit 254, while eRXDiff− is input to the negative terminal of circuit 252 and to the positive terminal of circuit 254. Each circuit 252 and 254 receives the pre-enable signal (PreEnable) at its corresponding enable terminal. Outputs 228 and 230 of circuitry 212 are at the Y' terminals of circuits 252 and 254, respectively. Each of state-detection-and-hold circuits 252 and 254 may be configured such that it outputs a logic high signal (i.e., a "1") at its Y' terminal in response to detecting a state. Examples of state-detection-and-hold circuits 252 and 254 are shown in FIGS. 4A and 4B and described below.

With this configuration, AND gate 222 outputs a logic high signal (i.e., a "1") to latch 242, causing it to assert the transmitter enable signal (TXEN) when the Y' terminal output of each of state-detection-and-hold circuits 252 and 254 is a logic high signal (states detected) and the output of transmit disable pulse generator 202 is also a logic high signal (end of valid data is not detected).

Figure 3:
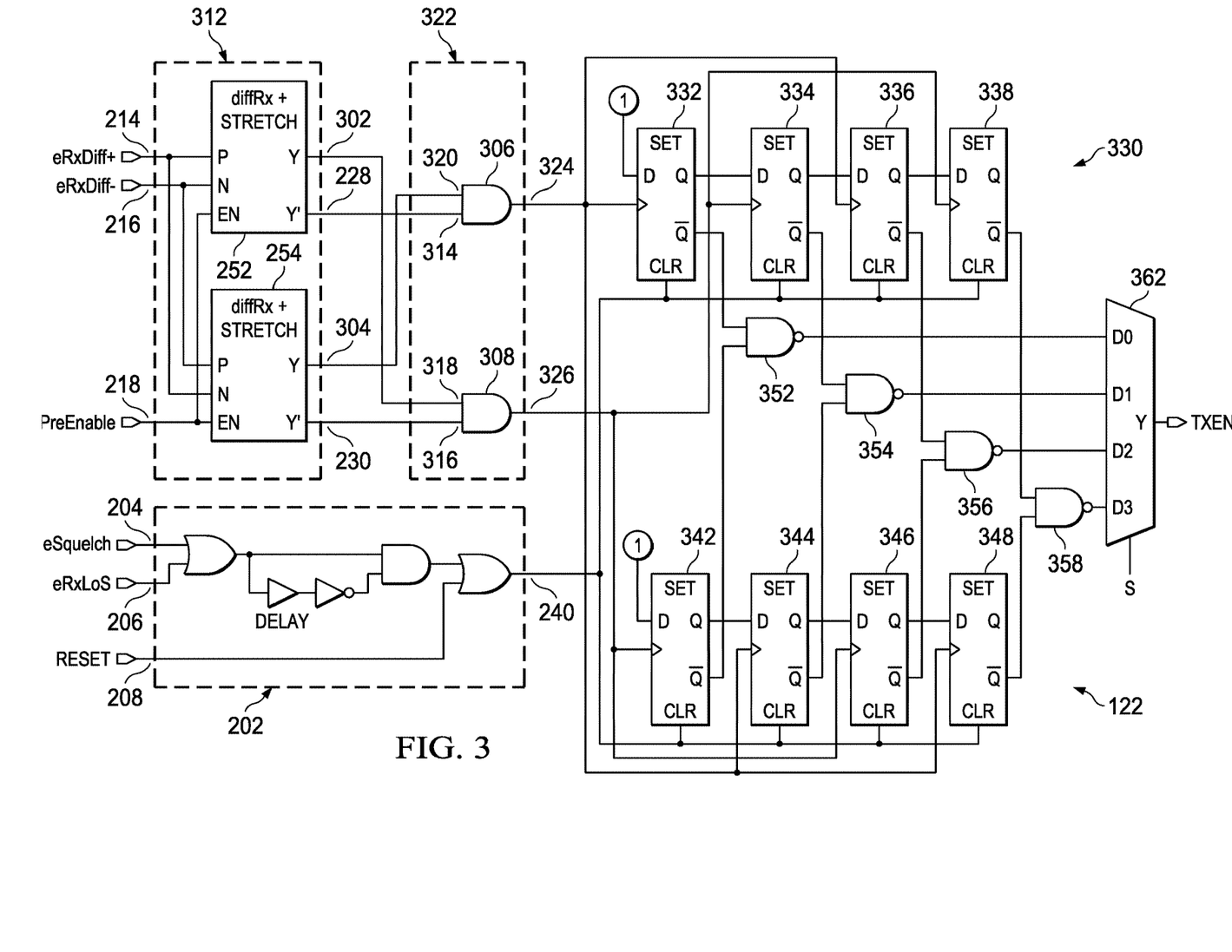
FIG. 3 is a diagram showing an example partial bit filter implemented in part as a network of flip-flops.

FIG. 3 shows partial bit filter 122 implemented in part as a network of flip-flops. The flop-flop-based implementation of partial bit filter 122 includes transmit disable pulse generator 202, which in this example uses an OR gate instead of the NOR gate—inverter gate combination used in the implementation of FIG. 2. Transmit disable pulse generator 202 in FIG. 3 has a single output 240. Partial bit filter 122 of FIG. 3 also includes state-detection-and-hold circuitry 312, and logic circuitry 322. State-detection-and-hold circuitry 312 is configured the same as its counterpart shown in FIG. 2, except the arrangement in FIG. 3 utilizes the outputs of the Y terminals of circuits 252 and 254, in addition to the outputs of their Y' terminals. Those additional outputs are labeled 302 and 304 in FIG. 3. Accordingly, logic circuitry 322 includes two AND gates 306 and 308, each with two inputs. Inputs 314 and 316 correspond to outputs 228 and 230 at the Y' terminals of circuits 252 and 254, respectively. Inputs 318 and 320 correspond to the Y terminal outputs (302 and 304) of circuits 252 and 254, respectively. Logic circuitry 322 includes two outputs 324 and 326 corresponding to the outputs of AND gates 306 and 308, respectively.

Outputs 324 and 326 of logic circuitry 322, as well as output 240 of transmit disable pulse generator 202, are coupled to a flip-flop network 330, which includes a first chain of series-coupled flip-flops: 332, 334, 336 and 338, and a second chain of series-coupled flip-flops: 342, 344, 346 and 348. Flip-flop network 330 also includes four NAND gates: 352, 354, 356 and 358. NAND gate 352 receives the Q complement outputs of paired flip-flops 332 and 342, NAND gate 354 receives the Q complement outputs of paired flip-flops 334 and 344, NAND gate 356 receives the Q complement outputs of paired flip-flops 336 and 346, and NAND gate 358 receives the Q complement outputs of paired flip-flops 338 and 348. With this configuration, flip-flop network 330 forms four shift register stages, each composed of paired flip-flops in the first and second chains and their common NAND gate.

The output of AND gate 306 is provided as the clock input to flip-flops 332, 336, 344 and 348, and the output of AND gate 308 is provided as the clock input to flip-flops 334, 338, 342 and 346. Output 240 of transmit disable pulse generator 202 is provided as the clear input to each of the flip-flops in flip-flop network 330. The data inputs (D) of flip-flops 332 and 342 are tied to logic high, "1".

The outputs of NAND gates 352, 354, 356 and 358 are input to a multiplexer 362, which outputs the transmitter enable signal (TXEN) based on the selected one of those inputs, depending on how many bits are configured to be dropped.

Partial bit filter 122 using flip-flop network 330 as filter circuitry filters out not only the first partial bit, but additional sync bits. Each shift register stage filters out an additional bit. Thus, in the illustrated example, up to four bits are filtered. However, flip-flop network 330 is not limited to four shift register stages; rather, any suitable number of shift register stages may be included to filter out the desired number of additional bits.

FIGS. 4A and 4B show example state-detection-and-hold circuits 400 and 450. Each of state-detection-and-hold circuits 252 and 254 may be implemented with either circuit 400 or circuit 450. Each of state-detection-and-hold circuits 400 and 450 may be used to detect states, whether J state or K state of the differential input signal.

Referring to FIG. 4A, state-detection-and-hold circuit 400 includes a differential state detector (e.g., comparator) with a programmable threshold 402, which is coupled to a power supply (e.g., VCC) and to ground 404. Differential state detector 402 includes positive (P+) and negative (N—) inputs at which eRXDiff+ and eRXDiff− are received, respectively. Differential state detector 402 detects states of the differential signal and outputs a signal Y (at its Y terminal) indicative of such detection. Signal Y is input to the anode terminal of a diode 406. A parallel RC circuit including resistor R1 and capacitor C1 is coupled between the cathode terminal of diode 406 and ground 404. When signal Y is output at a first, e.g., high, logic level in response to detecting a state, C1 is charged. R1 will discharge C1 when state is no longer detected. The discharge delay is thus determined by the values of R1 and C1, each of which may be set to achieve a desired delay, e.g., a 4 unit interval (UI) delay. Thus, the signal Y' is held or stretched at the first, e.g., high, logic level for a time determined by R1C1 after Y goes to a second, e.g., low, logic level.

The state-detection-and-hold circuit 450 of FIG. 4B also includes a differential state detector (e.g., comparator) with a programmable threshold 452, which is coupled to a power supply (e.g., VCC) and to ground 454. Differential state detector 452 includes positive (P+) and negative (N—) inputs at which eRXDiff+ and eRXDiff− are received, respectively, to detect J state or eRXDiff− and eRXDiff+ are received to detect K state. Differential state detector 452 detects states in the differential signal and outputs a signal Y (at its Y terminal) indicative of such detection. Signal Y is input to the gate of an N-channel metal-oxide-semiconductor field-effect transistor (MOSFET) 456. A resistor R1 is coupled between the drain of transistor 456 and VCC, and a capacitor C1 is coupled between the drain and source of transistor 456. The source of transistor 456 is also coupled to ground 454. In circuit 450, when signal Y is output at a first, e.g., high, logic level in response to detecting a state, C1 is discharged. R1 will charge C1 when state is no longer detected. The delay is thus determined by the values of R1 and C1, each of which may be set to achieve a desired delay, e.g., a 4 UI delay. Thus, the signal Y' is held or stretched at the first, e.g., high, logic level for a time determined by R1C1 after Y goes to a second, e.g., low, logic level.

Figure 5:
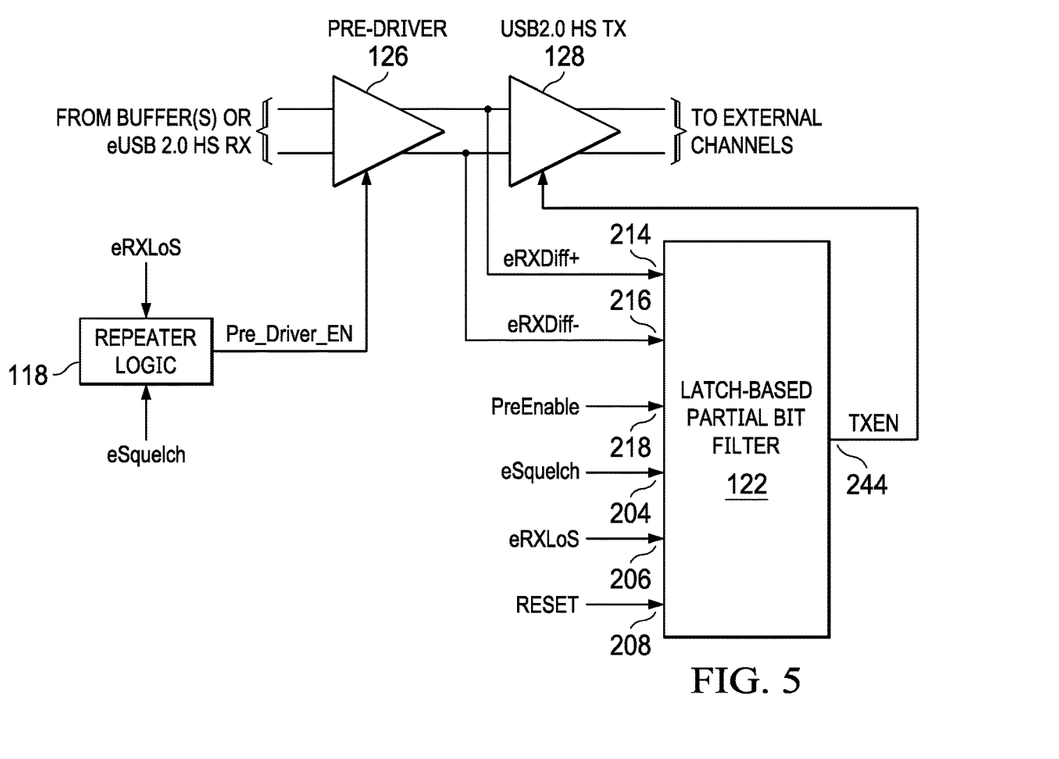
FIG. 5 is a diagram showing an example implementation of a latch-based partial bit filter in an example eUSB2 repeater.

FIG. 5 is a diagram showing example control, in which partial bit filter 122 implemented with a latch and its output, transmitter enable signal (TXEN), is used to control transmitter 128, and repeater logic 118 and its output, Pre_Driver_EN (corresponding to EN_1 of FIG. 1), is used to control pre-driver 126. This control scheme filters a partial bit, which may occur because Pre_Driver_EN arrives at pre-driver 126 after data has already arrived at the input of pre-driver 126.

Figure 6:
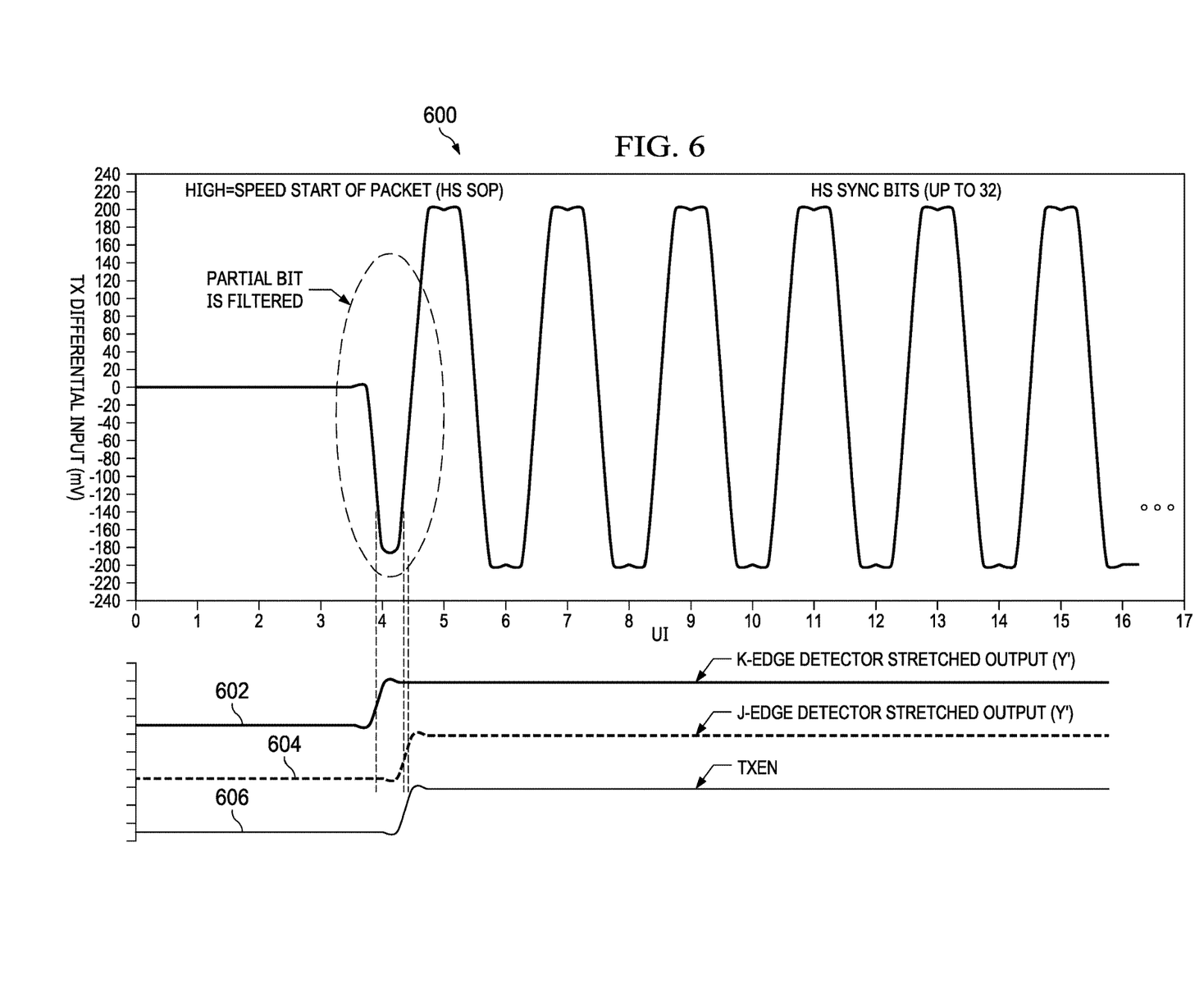
FIG. 6 is a timing diagram of signals in an implementation, such as that shown in FIG. 5, in which the input to the eUSB2 transmitter is monitored by state-detection-and-hold circuits.

In the example control scheme of FIG. 5, the pre-enable signal (PreEnable) is asserted by repeater logic 118 when data is expected, and differential signals eRXDiff+ and eRXDiff− are sampled between pre-driver 126 and transmitter 128 to filter a partial bit. The sampling point may be adjusted to match the timing with the data delay, so transmitter 128 is enabled very close to full bit transition. In this example, one of the two state-detection-and-hold circuits, e.g., circuit 252, is configured as a K state signal edge detector, and the other, e.g., circuit 254, is configured as a J state signal detector to monitor the input to transmitter 128. FIG. 6 shows a graph 600 of the voltage of differential input signal at transmitter 128 with respect to time (measured in UIs), together with the output signal (Y') of each of the K-state and J-state detection-and-hold circuits and transmitter enable signal (TXEN). In an example, TXEN goes high to enable transmitter 128 after partial bit filtering is complete. As a result, the output of transmitter 128 does not have a partial bit.

The example control scheme of FIG. 5 is shown in the eUSB2 to USB 2.0 direction. However, such control scheme may also be applied in the opposite direction, as well as in USB 2.0 to USB 2.0 systems and eUSB2 to eUSB2 systems.

Figure 7:
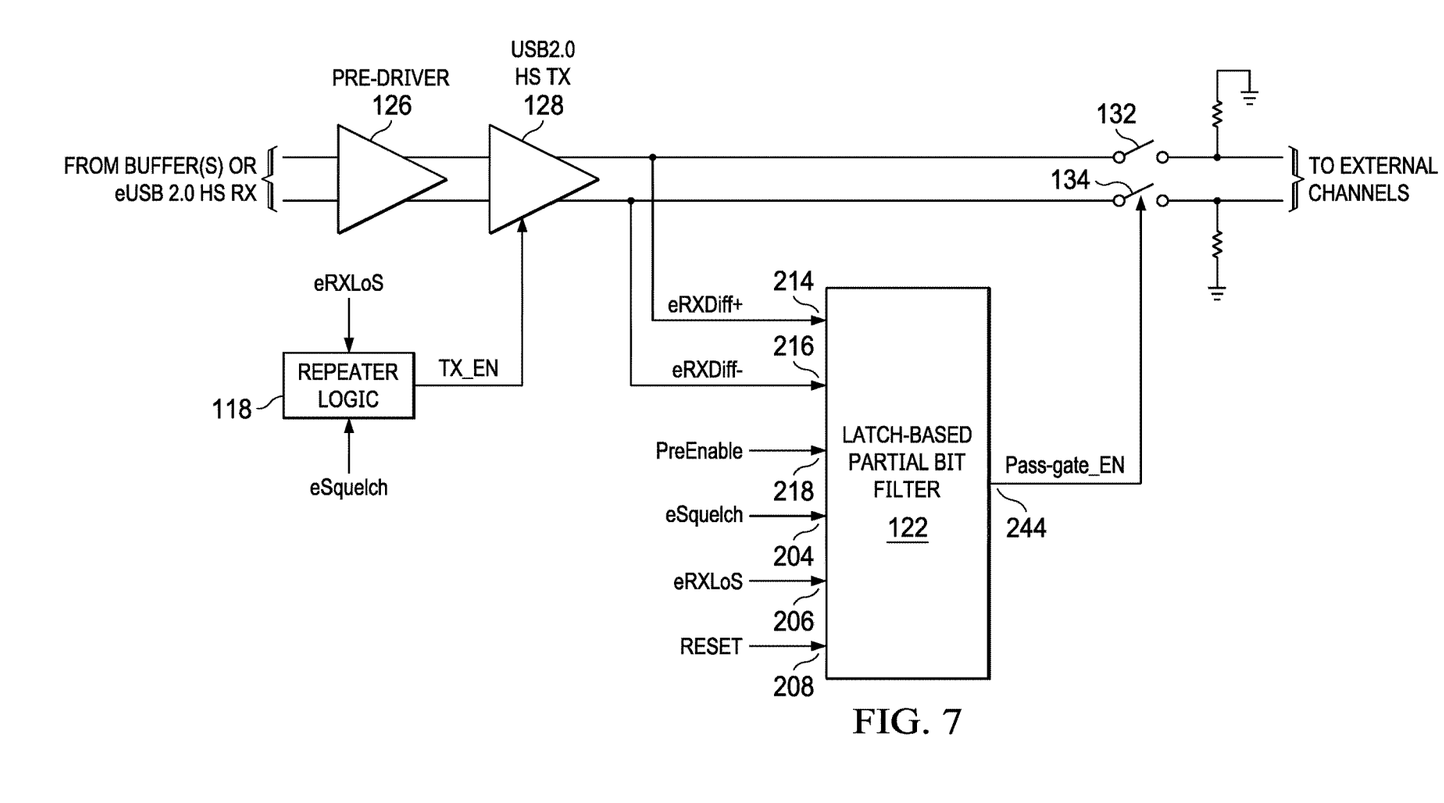
FIG. 7 is a diagram showing another example implementation of a latch-based partial bit filter in an example eUSB2 repeater.

FIG. 7 shows another example control scheme, in which partial bit filter 122 implemented with a latch and its output, which is a pass-gate enable signal (Pass-gate_EN) in this example, are used to control pass-gates 132 and 134 between the output of transmitter 128 and the resistive shunt paths in eUSB2 repeater 100, and repeater logic 118 and its output, which is a transmitter enable signal (TX_EN) in this example, are used to control transmitter 128. This control scheme filters a partial bit, which may occur because TX_EN arrives at transmitter 128 after data has already arrived at the input of transmitter 128.

In the example control scheme of FIG. 7, the pre-enable signal (PreEnable) is asserted by repeater logic 118 when data is expected, and differential signals eRXDiff+ and eRXDiff− are sampled between the output of transmitter 128 and pass-gates 132 and 134 to filter a partial bit. In this example, one of the two state-detection-and-hold circuits, e.g., circuit 252, is configured as a K state signal detector, and the other, e.g., circuit 254, is configured as a J state signal detector to monitor the output of transmitter 128. TXEN goes high to close pass-gates 132 and 134 after partial bit filtering is complete. As a result, the output of transmitter 128 does not have a partial bit.

As is the case for example control scheme of FIG. 5, the example control scheme of FIG. 7 is shown in the eUSB2 to USB 2.0 direction. However, such control scheme may also be applied in the opposite direction, as well as in USB 2.0 to USB 2.0 systems and eUSB2 to eUSB2 systems.

Figure 8:
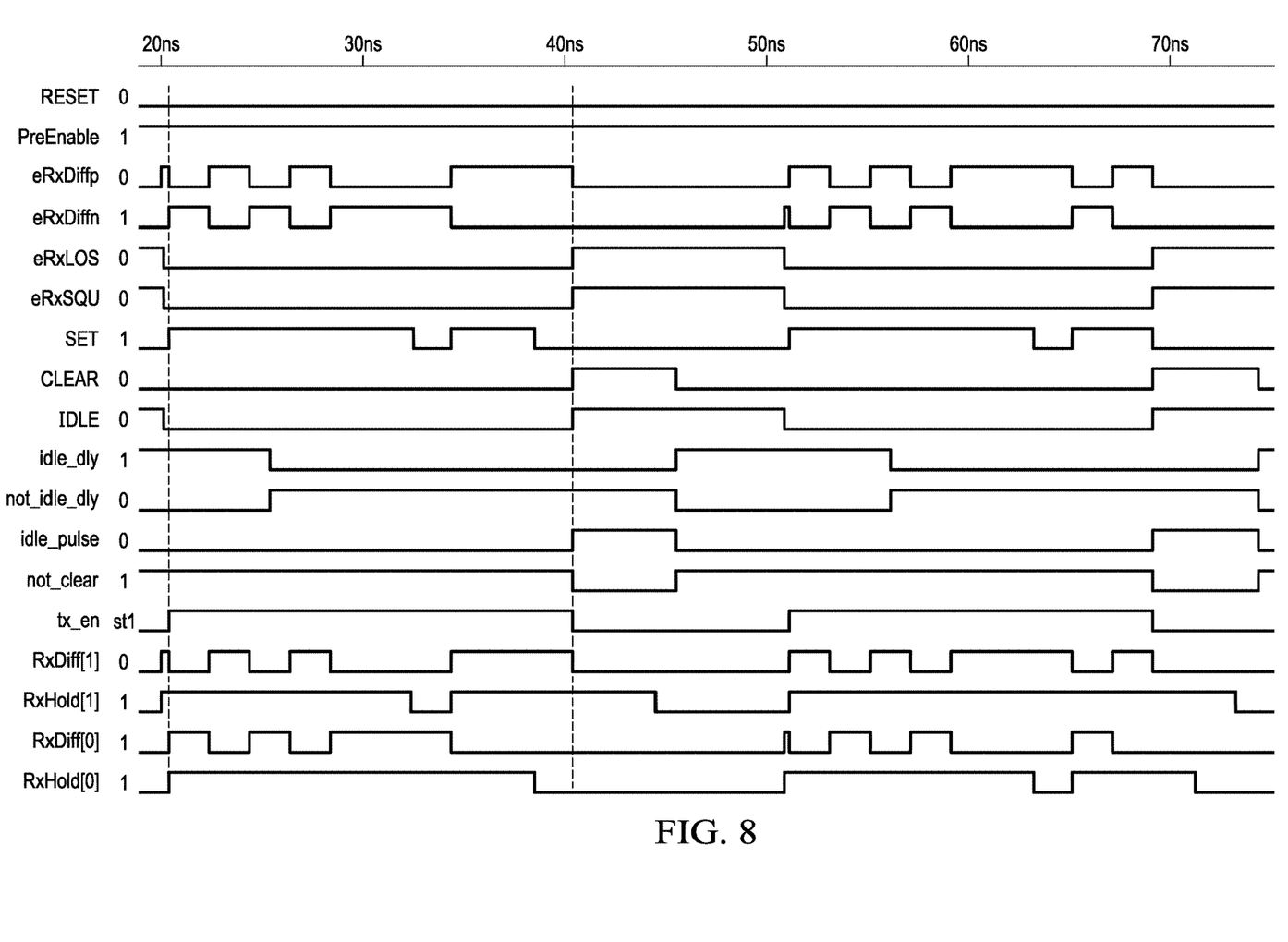
FIG. 8 is a timing diagram of signals in a latch-based partial bit filter implementation, such as that shown in FIG. 2.

FIG. 8 is a timing diagram of signals in a latch-based partial bit filter implementation of an example eUSB2 repeater, such as that shown in FIG. 2. The signals RxDiff[0] and RxDiff[1] in FIG. 8 correspond to the differential state detector outputs labeled Y in FIGS. 2 and 4, and the signals RxHold[0] and RxHold[1] correspond to the held/stretched outputs Y' in FIGS. 2 and 4. As the timing diagram of FIG. 8 shows, Y' (RxHold) goes high when Y (RxDiff) goes high and stays high both while Y (RxDiff) is high and for a fixed RC time after Y (RxDiff) goes low. If Y (RxDiff) is low for a shorter duration than the RC delay, the Y' (RxHold) output will not toggle.

Figure 9:
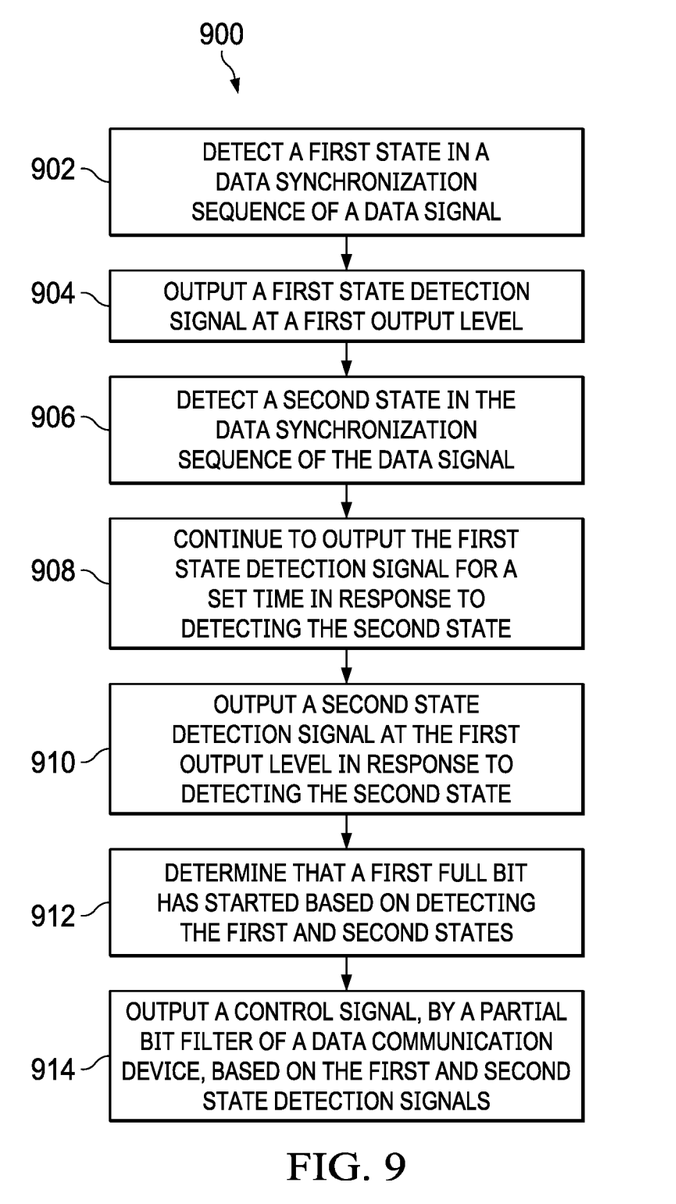
FIG. 9 is flow diagram of an example method of operating an example data communication device, e.g., a high-speed eUSB2 repeater.

FIG. 9 is a flow diagram of an example method 900 of operating an example data communication device, e.g., a high-speed eUSB2 repeater.

Operation 902 involves detecting a first state transitioning in a first (rising or falling) direction, in a data synchronization sequence of a data signal. In operation 904, in response to such detection, a first state detection signal at a first output level is output. The first bit is associated with the first state, and the first output level may be a logic high level or state.

In operation 906, a second state in the data synchronization sequence of the data signal is detected. If the first state was a J state, the second state is a K state, and vice versa. In operation 908, the output of a first state detection signal remains at the first output level for a set time in response to detecting the second state. The set time may be a minimum amount of time required to avoid metastable state of the storage component, whether flip-flop or latch, which can be triggered by a clock pulse or latch enable that is too short. In operation 910, also in response to detection of the second state, a second state detection signal at the first output level is output and used along with the detected first state in operation 912 to determine that the second bit, which is the first full bit, has started. The second bit is associated with the second state.

The first and second state detection signals are then used by a partial bit filter in determining when to output a control signal. In some examples, the control signal is an enable signal that is applied to enable a transmitter of the data communication device, and in other examples, the control signal is an enable signal that is applied to a pass-gate at the output of the transmitter. Control of the transmitter or transmission path is not limited to these examples. The partial bit filter determines when to control; how the control is carried out may vary based on known techniques.

FIG. 9 depicts one possible order of operation. One or more steps may be combined into a single operation. Alternative and/or additional operations may be employed consistent with the teachings herein.

Various examples of data communication devices, e.g., eUSB2 repeaters, and methods of operating the same, with partial bit filtering capability are disclosed. None of the example devices need nor use a PLL or CDR, which reduces power consumption, the size of the overall circuit or chip, and cost. The solutions provided herein may be employed to enable the repeater to interoperate with a legacy USB 2.0 physical layer. Moreover, the teachings herein may be applied to other interfaces including re-drivers and USB 2.0 repeaters implemented as re-drivers.

The term "coupled" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the term "terminal" encompasses a node, an interconnection, a pin and a lead. Unless specifically stated to the contrary, "terminal" generally means an interconnection between or a terminus of a device element, a circuit element, an integrated circuit, a device or other electronic or semiconductor component.

A circuit or device that is described herein as including certain components may instead be adapted to be coupled to those components to form the described circuitry or device. For example, a structure described as including one or more semiconductor elements may instead include only the semiconductor elements within a single physical device (e.g., a semiconductor die and/or integrated circuit (IC) package) and may be adapted to be coupled to other elements and/or voltage or current sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. A component, unless otherwise stated, may be representative of multiple instances of components configured to perform the stated functionality.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications of the described examples are possible, as are other examples, within the scope of the claims. Moreover, features described herein may be applied in other environments and applications consist with the teachings provided.

What is claimed is:

1. A partial bit filter, comprising:
   state-detection-and-hold circuitry having a first differential signal input, a second differential signal input, a first output and a second output;
   logic circuitry having a first input coupled to the first output of the state-detection-and hold-circuitry, and a second input coupled to the second output of the state-detection-and-hold circuitry; and
   filter circuitry coupled to the logic circuitry, the filter circuitry having a control output;
   wherein state-detection-and-hold circuitry comprises:
      a first state-detection-and-hold circuit and a second state-detection-and-hold circuit wherein at least one of the state-detection-and-hold circuits comprises:
         a comparator having first and second inputs directly coupled to the first differential signal input and the second differential input respectively, and an output;
         a diode having an anode terminal and a cathode terminal, the anode terminal directly coupled to the output of the comparator and the cathode terminal directly coupled to the first output;
         a resistor having a first terminal and a second terminal, the first terminal directly coupled to the first output and the second terminal directly coupled to ground; and
         a capacitor having first and second terminals, the first terminal directly coupled to the first output and the second terminal directly coupled to ground.

2. The partial bit filter of claim 1, wherein:
   the filter circuitry comprises a latch, and
   the logic circuitry comprises an AND gate having the first and second inputs of the logic circuitry, the AND gate further having an output.

3. The partial bit filter of claim 2, wherein the latch has the control output and a first input coupled to the output of the AND gate.

4. The partial bit filter of claim 1, wherein:
   the filter circuitry comprises a network of flip-flops,
   the state-detection-and-hold circuitry has third and fourth outputs, and
   the logic circuitry comprises an AND gate assembly having the first and second inputs of the logic circuitry, the logic circuitry further having third and fourth inputs coupled to the third and fourth outputs of the state-detection-and-hold circuitry, respectively, and having first and second outputs.

5. The partial bit filter of claim 4, wherein the network of flip-flops has a first input coupled to the first output of the AND gate assembly, a second input coupled to the second output of the AND gate assembly, and an output configured to output a control signal.

6. A data communication device, comprising:
   a receiver having first and second data inputs and first and second data outputs;
   a loss of signal detector coupled to the receiver, the loss of signal detector having first and second inputs and an output;
   a squelch detector having first and second inputs coupled to the first and second data inputs of the receiver, the squelch detector further having an output; and a partial bit filter having a first differential signal input, a second differential signal input, one or more inputs coupled to at least one of the outputs of the squelch detector and the output of the loss of signal detector, a reset signal input, and control output;

wherein the partial bit filter includes state-detection-and-hold circuitry;

wherein state-detection-and-hold circuitry comprises:
  a first state-detection-and-hold circuit and a second state-detection-and-hold circuit wherein at least one of the state-detection-and-hold circuits comprises:
    a comparator having first and second inputs directly coupled to the first differential signal input and the second differential input respectively, and an output;
    a diode having an anode terminal and a cathode terminal, the anode terminal directly coupled to the output of the comparator and the cathode terminal directly coupled to the first output;
    a resistor having a first terminal and a second terminal, the first terminal directly coupled to the first output and the second terminal directly coupled to ground; and
    a capacitor having first and second terminals, the first terminal directly coupled to the first output and the second terminal directly coupled to ground.

7. The data communication device of claim 6, further comprising:
repeater logic having first and second inputs and an enable output, the first and second inputs of the repeater logic coupled to the output of the loss of signal detector output and the output of the squelch detector, respectively.

8. The data communication device of claim 7, further comprising:
a pre-driver having first and second data inputs coupled to the first and second data outputs of the receiver, respectively, and a pre-enable signal input coupled to the enable output of the repeater logic, the pre-driver further having first and second data outputs; and
a transmitter having first and second data inputs coupled to the first and second data outputs of the pre-driver, respectively, and an enable signal input coupled to the control output of the partial bit filter.

9. The data communication device of claim 8, wherein the first and second differential signal inputs of the partial bit filter are coupled to the first and second data outputs of the pre-driver, respectively.

10. The data communication device of claim 7, further comprising:
a pre-driver having first and second data inputs coupled to the first and second data outputs of the receiver, respectively, the pre-driver further having first and second data outputs; and
a transmitter having first and second data inputs coupled to the first and second data outputs of the pre-driver, respectively, and an enable signal input coupled to the enable output of the repeater logic, the transmitter further having first and second data outputs.

11. The data communication device of claim 10, wherein the first and second differential signal inputs of the partial bit filter are coupled to the first and second data outputs of the transmitter.

12. The data communication device of claim 11, further comprising:

a first switch coupled to the first data output of the transmitter; and
a second switch coupled to the second data output of the transmitter;
wherein the first and second switches are configured to close in response to a pass gate enable signal output by the control output of the partial bit filter.

13. The partial bit filter of claim 1, wherein the state-detection-and-hold circuitry has a pre-enable signal input.

14. A partial bit filter, comprising:
state-detection-and-hold circuitry having a first differential signal input, a second differential signal input, a first output and a second output;
logic circuitry having a first input coupled to the first output of the state-detection-and hold-circuitry, and a second input coupled to the second output of the state-detection-and-hold circuitry; and
filter circuitry coupled to the logic circuitry, the filter circuitry having a control output;
wherein state-detection-and-hold circuitry comprises:
  a first state-detection-and-hold circuit and a second state-detection-and-hold circuit wherein at least one of the state-detection-and-hold circuits comprises:
    a comparator having first and second inputs directly coupled to the first differential signal input and the second differential input respectively, and an output;
    a transistor having a control terminal, a first current terminal and a second terminal, wherein the control terminal is directly coupled to the control terminal;
    a resistor having a first terminal and a second terminal, the first terminal directly coupled to the first current terminal; and
    a capacitor having first and second terminals, the first terminal directly coupled to the first current terminal and the second terminal directly coupled to ground.

15. The partial bit filter of claim 14, wherein:
the filter circuitry comprises a latch, and
the logic circuitry comprises an AND gate having the first and second inputs of the logic circuitry, the AND gate further having an output.

16. The partial bit filter of claim 2, wherein the latch has the control output and a first input coupled to the output of the AND gate.

17. The partial bit filter of claim 1, wherein:
the filter circuitry comprises a network of flip-flops,
the state-detection-and-hold circuitry has third and fourth outputs, and
the logic circuitry comprises an AND gate assembly having the first and second inputs of the logic circuitry, the logic circuitry further having third and fourth inputs coupled to the third and fourth outputs of the state-detection-and-hold circuitry, respectively, and having first and second outputs.

18. The partial bit filter of claim 4, wherein the network of flip-flops has a first input coupled to the first output of the AND gate assembly, a second input coupled to the second output of the AND gate assembly, and an output configured to output a control signal.

19. The partial bit filter of claim 14, wherein the state-detection-and-hold circuitry has a pre-enable signal input.

* * * * *